United States Patent
Kim et al.

(10) Patent No.: US 8,284,119 B2
(45) Date of Patent: Oct. 9, 2012

(54) METHOD OF REMOVING MOIRE PATTERN IN 3D IMAGE DISPLAY APPARATUS USING COMPLETE PARALLAX

(75) Inventors: Sung-sik Kim, Seoul (KR); Jung-young Son, Gyeonggido (KR); Chang-wan Hong, Gyeonggido (KR); Tae-hong Jeong, Gyeonggido (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2835 days.

(21) Appl. No.: 10/898,565

(22) Filed: Jul. 26, 2004

(65) Prior Publication Data

US 2005/0073472 A1 Apr. 7, 2005

(30) Foreign Application Priority Data

Jul. 26, 2003 (KR) .................. 10-2003-0051842

(51) Int. Cl.
*G09G 3/00* (2006.01)
(52) U.S. Cl. .............. 345/6; 359/619; 359/458; 349/57; 345/55; 345/32
(58) Field of Classification Search .................. 345/32, 345/6, 55; 359/455, 458, 619, 621; 349/57; 353/69
See application file for complete search history.

(56) References Cited

U.S. PATENT DOCUMENTS

| | | | | | |
|---|---|---|---|---|---|
| 3,897,136 | A | * | 7/1975 | Bryngdahl | 359/489 |
| 5,463,720 | A | * | 10/1995 | Granger | 358/1.9 |
| 5,956,001 | A | * | 9/1999 | Sumida et al. | 345/55 |
| 6,791,715 | B1 | * | 9/2004 | Fujita | 358/1.9 |
| 2003/0025995 | A1 | | 2/2003 | Redert et al. | |

FOREIGN PATENT DOCUMENTS

| | | | |
|---|---|---|---|
| JP | 2-123342 | A | 5/1990 |
| JP | 2000-89683 | A | 3/2000 |
| JP | 2001-42310 | A | 2/2001 |
| JP | 2001042310 | * | 2/2001 |
| JP | 2002-081923 | A | 3/2002 |
| JP | 2002-228974 | A | 8/2002 |
| JP | 2002-250895 | A | 9/2002 |
| KR | 2001-0098308 | A | 11/2001 |

* cited by examiner

*Primary Examiner* — Lun-Yi Lao
*Assistant Examiner* — Tom Sheng
(74) *Attorney, Agent, or Firm* — Sughrue Mion, PLLC

(57) ABSTRACT

A method of removing a Moire pattern in a 3D image display apparatus using complete parallax. The method of removing a Moire pattern in a 3D image displaying system with an image display device having an image display panel and a unit for providing complete parallax, by intersecting the image display panel and the unit with each other at a predetermined angle. The unit is an intersection lenticular plate or a micro lens array plate located at a front or rear of the image display panel.

8 Claims, 5 Drawing Sheets

METHOD OF REMOVING MOIRE PATTERN IN 3D IMAGE DISPLAY APPARATUS USING COMPLETE PARALLAX

BACKGROUND OF THE INVENTION

This application claims the priority of Korean Patent Application No. 2003-51842, filed on Jul. 26, 2003, in the Korean Intellectual Property Office, the disclosure of which is incorporated herein in its entirety by reference.

1. Field of the Invention

The present invention relates to a method of improving the quality of an image displayed in a three-dimensional (3D) image display apparatus, and more particularly, to a method of removing a Moire pattern in a 3D image display apparatus using complete parallax with two lenticular plates or micro-lens array plate.

2. Description of the Related Art

Generally, Moire pattern is a natural interference phenomenon that occurs when two separated periodical patterns are overlapped with each other at a predetermined angle. The Moire pattern appears in the shapes of wave, ripple, and a small wisp that seems to be overlapped with a display image of a screen due to an intensity variation. The Moire pattern appears in all color Cathode Ray Tube Televisions (CRT TV).

In a CRT, phosphorence is generated while an electron beam is incident from an electron gun on a shadow mask doped with phosphor. In the shadow mask, a phosphorence generation area is matched with an electron-beam incident area and thus the phosphorence pattern formed by the electron beam overlaps with a regular pattern. In the CRT, the Moire pattern is generated due to both the regular shadow mask pattern and the phosphorence pattern. Therefore, when the Moire pattern is not generated on a screen of the CRT, it is usually because the electron beam emitting from the electron gun of the CRT is not accurately incident on a center of the phosphor. As a result, the CRT image appears to be fuzzy.

This drawback is generated apparently because an incident area of the electron beam is equal to a size of the pixel generated by a video board, while the pixel is less than the phosphor in size. Therefore, the above drawback can be overcome by making the phosphor identical in size to the pixel generated by the video board.

Meanwhile, in a liquid crystal display device (LCD), each liquid crystal cell operates as one pixel. Hence, the Moire pattern does not appear in the liquid crystal display device itself.

However, the 3D image display apparatus for embodying the complete parallax by using two lenticular plates includes a flat display panel, that is, the liquid crystal display device that is used as the image display panel; and the overlying micro lens array plate or two lenticular plates that is or are overlapped with the flat display panel. Accordingly, the Moire pattern is formed when the pitch between the micro lenses or the pitch between contact regions of the lenses constructing each of the lenticular plates.

In particular, the micro lens array plate or the lenticular plate has a thickness. Accordingly, the thickness causes the viewing distance or the viewing angle to be varied.

Therefore, it is difficult to completely remove the Moire pattern in the conventional 3D image displaying apparatus using the micro lens array plate or the two lenticular plates to embody the complete parallax.

SUMMARY OF THE INVENTION

The present invention provides a method of removing a Moire pattern in which the influence of the Moire pattern can be excluded while realizing a 3D image using complete parallax.

According to an aspect of the present invention, there is provided a method of removing a Moire pattern that appears when a first plate having first patterns formed at a first period overlaps with a second plate having second patterns formed at a second period, the method including: intersecting the first and second plates with each other at a predetermined angle.

The first and second plates may be intersected at an angle of a maximal space frequency of the Moire pattern, and the first and second plates may be intersected at an angle of a minimal variation rate of a space frequency of the Moire pattern depending on a viewing distance.

At least one of the first and second patterns may be a grid. At this time, the intersection angle may be 20°~30°.

In another aspect of the present invention, there is provide a method of removing a Moire pattern in a 3D image displaying system with an image display device having an image display panel and a unit for providing complete parallax, the method including: intersecting the image display panel and the unit with each other at a predetermined angle.

The image display panel and the unit may be intersected at an angle of a maximal space frequency of the Moire pattern, and the image display panel and the unit are intersected at an angle of a minimal variation rate of a space frequency of the Moire pattern depending on a viewing distance.

The image display panel and the unit may be intersected at an angle between 20-30 degrees, and also about 26 degrees.

The unit may be located at a front or rear of the image display panel.

According to the present invention, since the space frequency of the Moire pattern can be increased to make an interval of the Moire patterns narrower than an interval that can be recognized by human's eyes, the viewer cannot substantially recognize the Moire pattern and as a result, can view a good quality of image without the effect of the Moire pattern.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
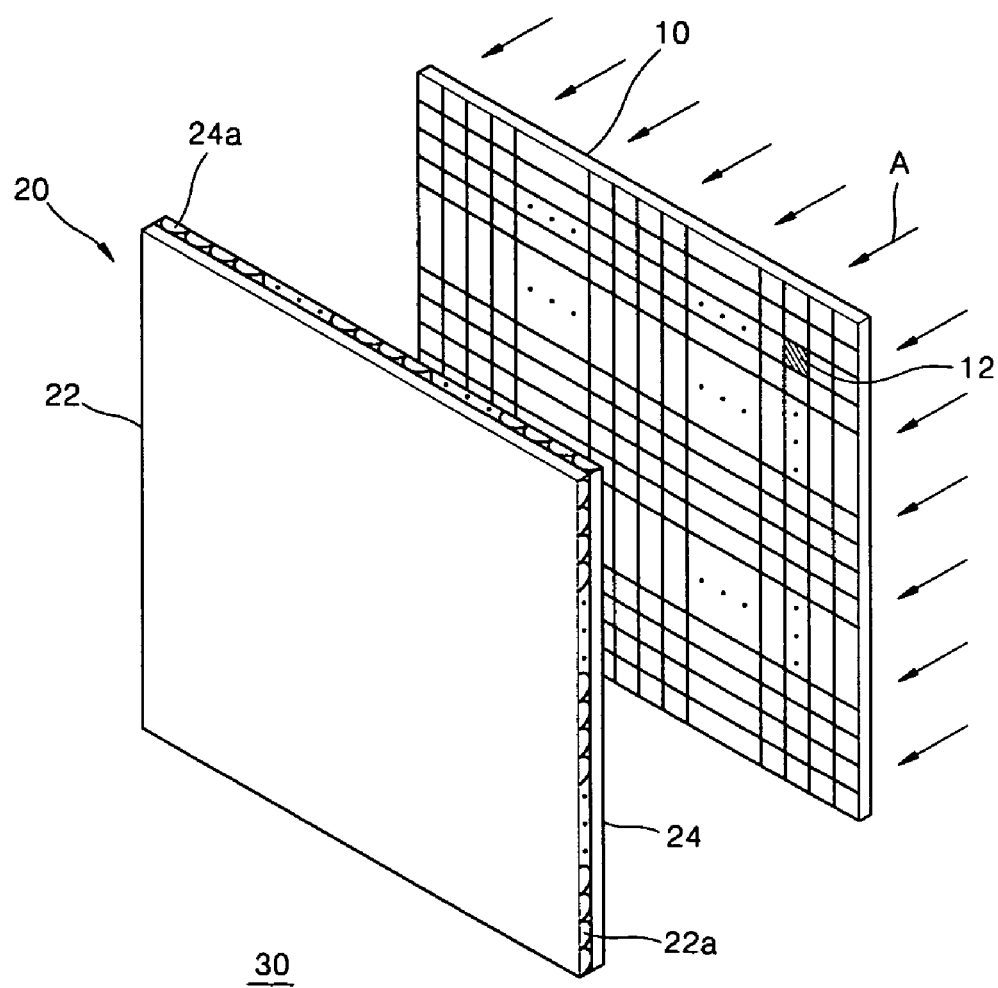
FIG. 1 is a 3D diagram illustrating a schematic construction of an image displaying apparatus included in a 3D image display system using complete parallax.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. It will also be understood that when a layer is referred to as being "on" another layer or substrate, it can be directly on the other layer or substrate, or intervening layers may also be present.

As noted as a drawback of a conventional art, it is difficult to remove a Moire pattern in a 3D image displaying apparatus using a micro lens array plate or two lenticular plates so as to embody complete parallax. Accordingly, a preferred embodiment of the present invention is directed to a method where an existing Moire pattern is not recognized by viewer's eyes, rather than a method where the existing Moire pattern is removed. Together with this, a preferred embodiment of the present invention is directed to a method where the Moire pattern is not greatly varied depending on a viewing distance or a viewing direction since the Moire pattern is varied depending on the viewing distance or the viewing direction.

In theory, in order to reduce an effect of the Moire pattern in a 3D image displaying apparatus using the complete parallax, a period of an interference fringe constructing the Moire pattern is made smaller than a size of a light point that is given by a resolution of human's eyes at a predetermined distance. Further, an image display panel and a unit for embodying the complete parallax are overlapped at a positional angle at which the Moire pattern is not varied in size, to a recognizable extent, depending on the viewing distance or the viewing angle. The unit is the micro lens array plate or an intersection lenticular plate. In the intersection lenticular plate, two lenticular plates are attached to each other such that lens surfaces are vertically intersected to one another.

FIG. 1 is a 3D diagram illustrating a schematic construction of the image displaying apparatus included in a 3D image display system using the complete parallax.

Referring to FIG. 1, a reference numeral 30 denotes a viewing region, 10 denotes a flat display panel, for example, a liquid crystal display (LCD), and 20 denotes the intersection lenticular plate for displaying an image displayed through the flat display panel 10 to a viewer as a 3D image. The intersection lenticular plate 20 includes a first lenticular plate 22 directing to the viewing region 30; and a second lenticular plate 24 directing to the flat display panel 10 disposed at the rear. A plurality of first lenticular lenses 22a is arrayed in parallel with one another in a horizontal direction to the first lenticular plate 22. A plurality of lenticular lenses 24a is arrayed in parallel with one another in a vertical direction to a vertical direction to the second lenticular plate 24. Accordingly, in the intersection lenticular plate 20, the first and second lenticular lenses 22a and 24a are intersected with one another, and each of the lenticular lenses are in contact with one another at an intersection portion.

In an aspect of forming the Moire pattern, the overlaying of the flat display panel 10 with the intersection lenticular plate 20 is simply the same as overlaying two grid plates including a large number of square grids.

For example, when the flat display panel 10 employs the liquid crystal panel, the flat display panel 10 has a periodical structure where a square pixel 12 is arrayed in a checker board type or in a checker pattern type. Accordingly, the flat display panel 10 can use the first grid plate including the same number of the square grids as the number of the pixels.

Further, since each of the lenticular plates constructing the intersection lenticular plate 20 has the lenses vertically intersected in contact with one another, a contact portion of the lenses can be embodied using one square grid. Accordingly, the intersection lenticular plate 20 can be embodied using the second grid plate including the same number of the square grids as the number of the pixels.

As described above, the flat display panel 10 and the intersection lenticular plate 20 can be all embodied using the grid plate including the same grid. Accordingly, the Moire pattern displayed on the image display panel of FIG. 1 is identical with the Moire pattern, which is formed when the first and second grid plates are overlapped at a state where the first and second grid plates are spaced away by a distance corresponding to a thickness of the intersection lenticular plate 20.

Figure 2:
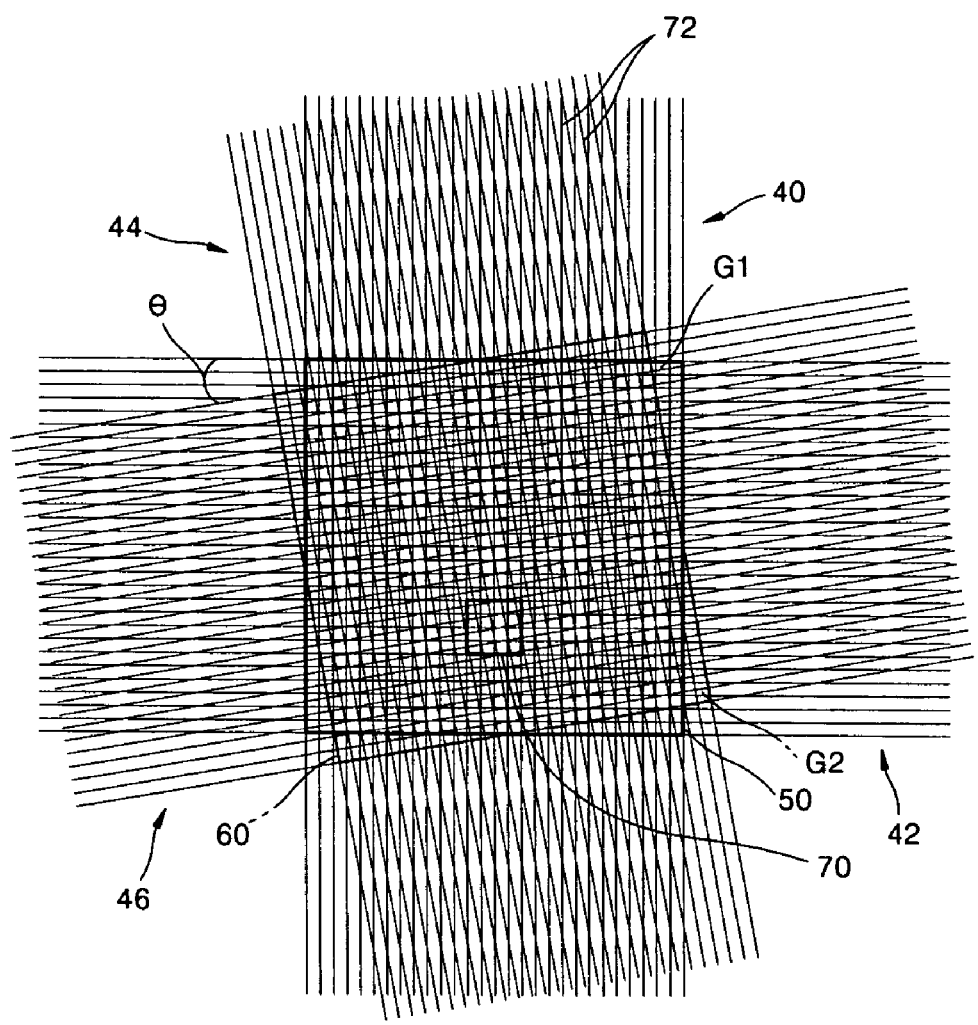
FIG. 2 is a front view illustrating a case where two grid plates are rotated at a predetermined angle and overlapped without an interval therebetween, wherein the two grid plates respectively correspond to a flat display apparatus and an intersection lenticular plate of an image display apparatus of FIG. 1.

FIG. 2 illustrates the Moire pattern formed when the first and second grid plates are overlapped with each other without an interval therebetween in the image displaying apparatus of FIG. 1.

In FIG. 2, a reference numeral 50 denotes a first grid plate, and a reference numeral 60 denotes the second grid plate that is rotated by a predetermined angle θ, for example, by about 11 degrees. Additionally, reference numerals 40 and 42 denote first and second linear grids that form the first grid plate 50. Further, reference numerals 44 and 46 denote third and fourth linear grids that form the second grid plate 60. A reference numeral G1 denotes a first square grid forming the first grid plate 50, and a reference numeral G2 denotes a second square grid forming the second grid plate 60. One first squire grid G1 corresponds to one pixel, and one second square grid G2 corresponds to the one first square grid G1.

Referring to FIG. 2, the interference fringe 70 formed repetitively at a predetermined period, that is, the Moire pattern 70 appears at an overlaying region of the first and second grid plates 50 and 60. Further, the same interference fringe 72 also appears at an overlaying region of the first and third linear grids 40 and 44, and at an overlaying region of the second and fourth linear grids 42 and 46.

The period of the interference fringe 70 is formed by a relative transition of a grid position that is provided by intersecting two grids having the same characteristic, and is the same as a value obtained by dividing an original period of grid by a transition amount. Therefore, as the transition amount is decreased, the period of the interference fringe is increased.

Figure 3:
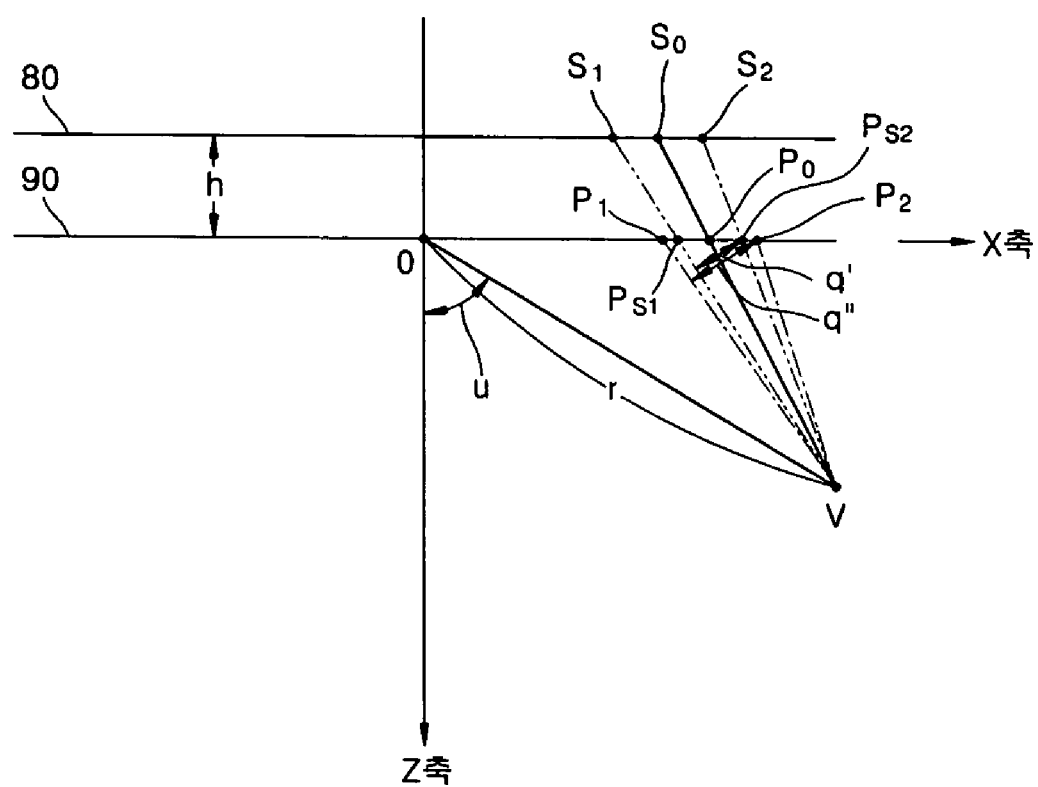
FIG. 3 is a view illustrating variation of a grid pitch of each grid plates, which is varied depending on a viewing position at two grid plates that are spaced away at a predetermined interval.

FIG. 3 is a plan view illustrating a pitch between the grids constructing a third grid plate 80 and a pitch between the grids constructing a fourth grid plate 90, which are varied depending on a viewing position.

Referring to FIG. 3, a mathematical expression can be obtained for the Moire pattern that is viewed at a viewer's position "V".

In detail, the third grid plate 80 functions as the flat display panel, for example, the liquid crystal panel, and the fourth grid plate 90 functions as the intersection lenticular plate that is spaced away by a predetermined distance "h" from the third grid plate 80.

In the meantime, it is assumed that Z-axis is a straight line connecting centers of the third and fourth grid plates 80 and 90 with each other, and X-axis is disposed along the fourth grid plate 90. Accordingly, Y-axis (not shown) is disposed in a vertical direction with respect to a plane including X-axis and Z-axis.

In FIG. 3, it is assumed that the viewer's position "V" is disposed on the plane including X-axis and Z-axis (Hereinafter, referred to as "X-Z plane"), that is, on the plane where Y-axis is zero. The viewer's position "V" on the X-Z plane is a position that is rotated by a predetermined angle "u" from Z-axis, and spaced away by a predetermined distance "r" from a center of the fourth grid plate 90. Accordingly, the viewer's position "V" has a polar coordinate (r sin u, 0, r cos u).

When the viewer views predetermined positions of the third and fourth grid plates 80 and 90 at the viewer's position "V", for example, when the viewer views the grid of the third grid plate 80 with a first pitch S2-S1 and the grid of the fourth grid plate 90 with a second pitch P2-P1, the first pitch S2-S1 is relatively reduced in comparison with the second pitch P2-P1 since the third grid plate 80 is located more distantly than the fourth grid plate 90 from the viewer's position "V".

This fact is proved through projecting the first pitch S2-S1 to the fourth grid plate 90.

Describing in detail, reference numerals PS1 and PS2 of FIG. 3 correspond to a portion of the grid having the first pitch S2-S1 on the third grid plate 80 that is projected to the fourth grid plate 90a, that is, a start point and an end point of the projected grid. Accordingly, the pitch of the projected grid (Hereinafter, referred to as "third pitch") corresponds to PS2-PS1. Since the projected grid with the third pitch PS2-PS1 is the one corresponding the grid of the third grid plate 80 spaced away distantly from the viewer's location "V", which is projected to the fourth grid plate 90 closer to the viewer's position "V" along the same sight line, the third pitch PS2-PS1 is reasonably less than the second pitch P2-P1. Resultantly, it looks as though the first pitch S2-S1 is smaller than the second pitch P2-P1 at the viewer's position "V".

In the meantime, real pitches of the second pitch P2-P1 and the third pitch PS2-PS1, which are observed at the viewer's position "V", are the same as the lengths that are obtained when the second pitch P2-P1 and the third pitch PS2-PS1 are projected on a vertical plane to a line connecting the viewer's position "V", a center SO of the first pitch S2-S1, and a center P0 of the second pitch P2-P1 with one another.

The Moire pattern "M" formed by the overlaying of the third and fourth grid plates 80 and 90 can be expressed in the following Equation 1.

$$M = \left[1 + \sin\left(\frac{2\pi}{q''}x\right)\right]\left[1 + \sin\left(\frac{2\pi}{p}y\right)\right]AA \quad \text{[Equation 1]}$$

where
q": a length of the second pitch P2-P1 projected on the plane
q': a length of the third pitch PS2-PS1 projected on the plane
AA: a period integer of the grid that is given in Equation 2;

where p is the pixel pitch $$AA = \left[1 + \sin\left(\frac{2\pi}{q'}x\sin u_1 - \frac{2\pi}{p}y\cos u_1\right)\right]\left[1 + \sin\left(\frac{2\pi}{p}y\sin u_1 - \frac{2\pi}{q'}x\cos u_1\right)\right] \quad \text{[Equation 2]}$$

where
q' is given in the following Equation 3

$$q' = \sqrt{p - p'^2} \quad \text{[Equation 3]}$$

where
q" of Equation 1 is given in the following Equation 4

$$q'' = \sqrt{[d_2(x,h) - d_1(x,h)]^2 - p''^2} \quad \text{[Equation 4]}$$

where
p' of Equation 3 and p" of Equation 4 are respectively given in the following Equations 5 and 6

$$p' = \sqrt{(r\sin u - (x - \frac{p}{2}))^2 + r^2\cos u^2} - \sqrt{(r\sin u - (x + \frac{p}{2}))^2 + r^2\cos u^2} \quad \text{[Equation 5]}$$

$$p'' = \sqrt{[r\sin u - d_1(x,h)]^2 + r^2\cos u^2} - \sqrt{[r\sin u - d_2(x,h)]^2 + r^2\cos u^2} \quad \text{[Equation 6]}$$

where
d1 and d2 are respectively given in the following Equations 7 and 8

$$d_1(x,h) = \frac{-r\sin u + [x - \frac{p}{2}]}{r\cos u + h}\left[r\cos u - \frac{r\cos u + h}{r\sin u - (x - \frac{p}{2})}r\sin u\right] \quad \text{[Equation 7]}$$

$$d_2(x,h) = \frac{-r\sin u + [x + \frac{p}{2}]}{r\cos u + h}\left[r\cos u - \frac{r\cos u + h}{r\sin u - (x + \frac{p}{2})}r\sin u\right] \quad \text{[Equation 8]}$$

In the Equations, a variation of the distance "r", that is, a variation of the viewer's position "V" is the same as a variation of a ratio of q' and q". Accordingly, if the Equation 1 is expressed with a variation of the angle "u" between Z-axis and the viewer's position "V" and with a variation of the grid pitches of the third and fourth grid plates 80 and 90, the variation of the Moire pattern depending on the distance "r" and the angle "u" of the viewer's position "V" can be expressed.

Figure 4:
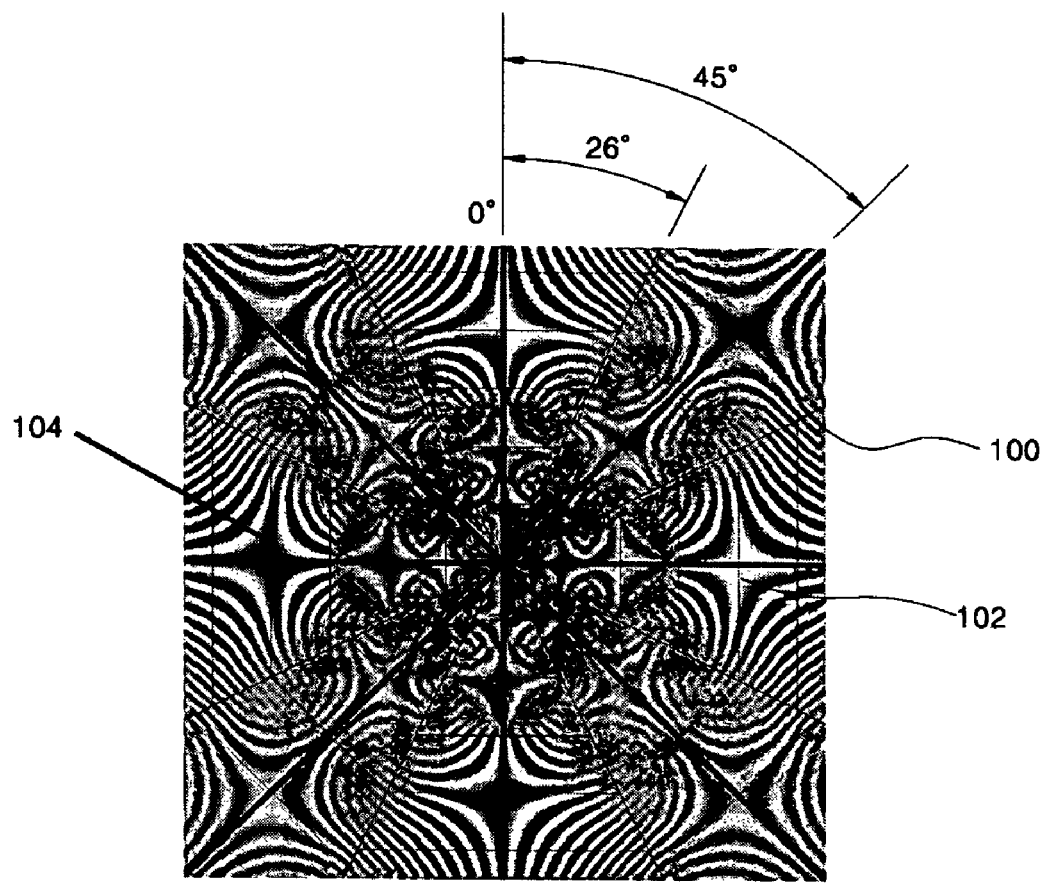
FIG. 4 is a photograph illustrating a variation of a Moire pattern that is shown when a grid plate having a square grid overlaps with a radial pattern with a period being continuously varied, and then the radial pattern is rotated by 360 degrees.

FIG. 4 illustrates a variation of a Moire pattern that is shown when the square grid (not shown) overlaps with a radial pattern 100 with the period being continuously varied, and then the radial pattern 100 is rotated by 360 degrees, that is, the angle "u" is varied by 360 degrees. In FIG. 4, a bright region and a dark region represent phase variations. For example, a reference numeral 102 denotes a region with a phase of +90 degrees, and a reference numeral 104 denotes a region with a phase of −90 degrees.

Referring to FIG. 4, a phase of the Moire pattern varies, but the form of the Moire pattern has the same shape as the period of 45 degrees. Additionally, the Moire pattern located at a position of about 26 degrees among the Moire patterns located between positions of 0 and 45 degrees has a constant period or pitch irrespective of the pitch variation of the radial pattern 100, and also has the largest space frequency. That is, there are the most Moire patterns in a unit pitch.

Next, FIGS. 5 through 9 illustrates the variation of the Moire pattern depending on the differences between the grid pitch of the third grid plate 80 and the grid pitch of the fourth grid plate 90 that are observed at five angles "u" different from one another between 0 and 45 degrees when the two grid plates, for example, the third and fourth grid plates (80 and 90 of FIG. 3) are overlapped, that is, the differences between the grid pitches that are observed respectively at the five angles when the fourth grid plate 90 is rotated at the five angles.

Figure 5:
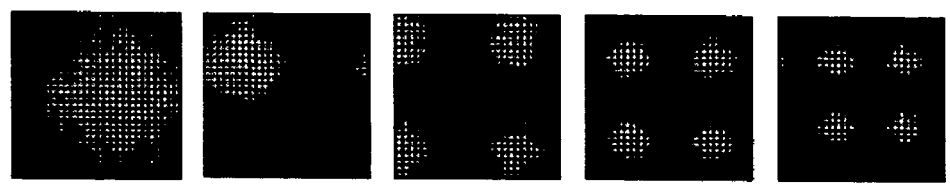
FIG. 5 is a photograph illustrating a variation of a Moire pattern shown when a pitch difference between grids, which construct two grid plates, is varied by 2% from 2% to 10% at an intersection angle of 0 degree.

FIG. 5 illustrates the variation of the Moire pattern shown when the pitch difference between the grids is varied by 2% from 2% to 10% at the angle "u" of 0 degree. The most left one is when the pitch difference is 2%, and the most right one is when the pitch difference is 10%. This array is the same as in FIGS. 6 to 9.

Referring to FIG. 5, as the pitch difference is large, a space frequency of the Moire pattern, that is, a space variation rate of the Moire pattern is increased.

Figure 6:
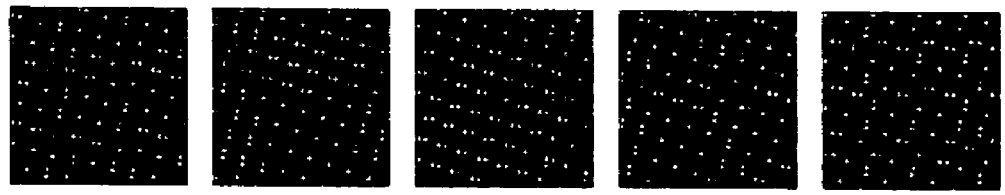
FIG. 6 is a photograph illustrating a variation of a Moire pattern shown when a pitch difference between grids, which construct two grid plates, is varied by 2% from 2% to 10% at an intersection angle of 18 degrees.

FIG. 6 illustrates the variation of the Moire pattern shown when the pitch difference between the grids is varied by 2% from 2% to 10% at the angle "u" of 18 degrees.

Referring to FIG. 6, the Moire pattern has approximate nine space frequencies, but the variation depending on the pitch difference is increased when the pitch difference is 10%, in comparison with a case that brightness period of the Moire pattern is different.

Figure 7:
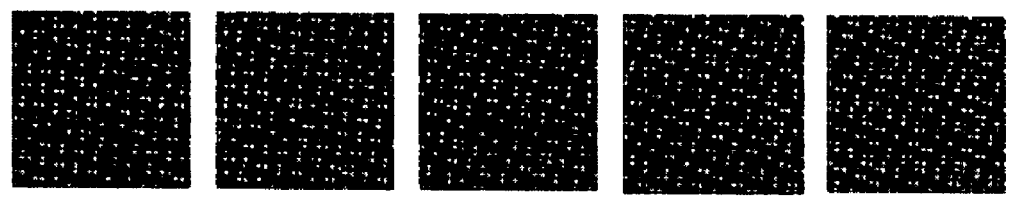
FIG. 7 is a photograph illustrating a variation of a Moire pattern shown when a pitch difference between grids, which construct two grid plates, is varied by 2% from 2% to 10% at an intersection angle of 22 degrees.

FIG. 7 illustrates the variation of the Moire pattern shown when the pitch difference between the grids is varied by 2% from 2% to 10% at the angle "u" of 22 degrees.

The Moire pattern shown in FIG. 7 has approximately eleven space frequencies, and has also the variation that is less than that of FIG. 6.

Figure 8:
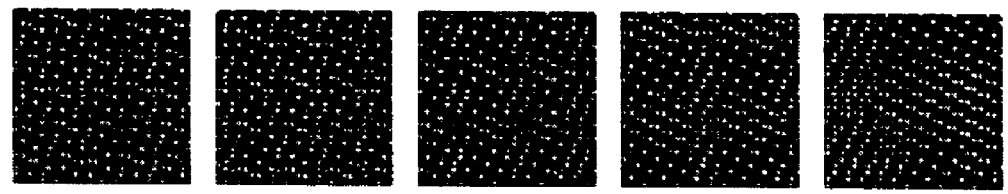
FIG. 8 is a photograph illustrating a variation of a Moire pattern shown when a pitch difference between grids, which construct two grid plates, is varied by 2% from 2% to 10% at an intersection angle of 26 degrees.

FIG. 8 illustrates the variation of the Moire pattern shown when the pitch difference between the grids is varied by 2% from 2% to 10% at the angle "u" of 26 degrees.

The Moire pattern shown in FIG. 8 has approximately thirteen space frequencies. As the pitch difference is increased, the variation with the space frequency being increased appeares.

In the variation of the Moire pattern shown in FIG. 8, the magnitude of one period of the space frequency of the Moire pattern, that is, the pitch between the Moire patterns is less than a minimal magnitude that the viewer can resolve. Accordingly, the viewer cannot recognize the Moire pattern, and cannot feel the effect of the Moire pattern while viewing the image.

Figure 9:
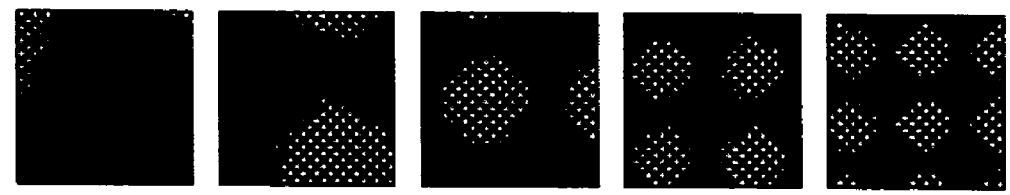
FIG. 9 is a photograph illustrating a variation of a Moire pattern shown when a pitch difference between grids, which construct two grid plates, is varied by 2% from 2% to 10% at an intersection angle of 45 degrees.

FIG. 9 illustrates the variation of the Moire pattern shown when the pitch difference between the grids is varied by 2% from 2% to 10% at the angle "u" of 45 degrees.

The Moire pattern shown in FIG. 9 has the space frequency that is increased, similarly with the Moire pattern being at 0 degree, as the pitch difference is increased, but the space frequencies are less, i.e., approximately three even when the pitch difference is 10%.

Referring to FIGS. 5 through 9, the third and fourth grid plates 80 and 90 may have the intersection angle of 20 to 30 degrees for minimizing the effect of the Moire pattern, and also, may have the intersection of 26 degrees. At this intersection angle, the Moire pattern has a maximal space frequency, and has a minimal variation rate of the space frequency depending on the viewing distance.

Since the third and fourth grid plates 80 and 90 respectively correspond to the image display panel and the unit for the complete parallax, that is, the intersection lenticular plate or the micro lens array plate, it is preferable that the image display panel and the unit is intersected with each other at the angle of a maximal space frequency, and is intersected with each other at the angle of a minimal variation rate of the space frequency depending on the viewing distance.

As described above, the present invention intersects the flat display panel or the unit for the complete parallax at the predetermined angle in the 3D image displaying apparatus with reference to an optic resolution of the viewer's eyes. As a result, the period or pitch of the Moire pattern appearing in the 3D image is smaller than the magnitude that can be distinguished with the optic resolution of the viewer's eyes. This does not allow the viewer to recognize the Moire pattern. That is, the present invention can remove Moire phenomenon, which the most critical drawback of the 3D image, and can provide the viewer with a high picture of the 3D image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of adjusting a Moire pattern that appears when a first plate having a first pattern with a first period overlaps a second plate having a second pattern with a second period, the method comprising:

orienting the first and second plates with respect to each other such that the first pattern forms an angle with the second pattern, and a period of the Moire pattern is smaller than a period that can be detected by a viewer; and setting the angle between 20 and 30 degrees such that a variation of a spatial frequency of the Moire pattern as a function of a viewing distance is minimized.

2. The method of claim 1, further comprising maximizing a spatial frequency of the Moire pattern.

3. The method of claim 1, wherein at least one of the first and second patterns is a grid.

4. A method of modifying a Moire pattern in a 3D image displaying system with an image display device having an image display panel and a unit for providing complete parallax, the method comprising:

orienting the image display panel and the unit with respect to each other such that a first pattern of the image display panel forms an angle with a second pattern of the unit, and a period of the Moire pattern is smaller than a period that can be detected by a viewer; and setting the angle between 20 and 30 degrees such that a variation of a spatial frequency of the Moire pattern as a function of a viewing distance is minimized.

5. The method of claim 4, further comprising maximizing a spatial frequency of the Moire pattern.

6. The method of claim 4, wherein the unit is located at a front or a rear of the image display panel.

7. The method of claim 6, wherein a flat display device is used as the image display panel, and an intersection lenticular plate or a micro lens array plate is used as the unit.

8. The method of claim 4, wherein a flat display device is used as the image display panel, and an intersection lenticular plate or a micro lens array plate is used as the unit.

* * * * *